United States Patent
Monge Nunez et al.

(10) Patent No.: US 10,931,767 B2
(45) Date of Patent: Feb. 23, 2021

(54) PRIORITIZING SOCIAL MEDIA POSTS AND RECOMMENDING RELATED ACTIONS

(71) Applicant: INTERNATIONAL BUSINESS MACHINES CORPORATION, Armonk, NY (US)

(72) Inventors: Roxana Monge Nunez, San Jose (CR); Ivonne Rocio Cuervo Fajardo, Cartago (CR); Juan G. Rodriguez, San Jose (CR); Jose Cano Zapata, Heredia (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 387 days.

(21) Appl. No.: 16/042,675

(22) Filed: Jul. 23, 2018

(65) Prior Publication Data

US 2020/0028925 A1 Jan. 23, 2020

(51) Int. Cl.
*G06Q 10/00* (2012.01)
*H04L 29/08* (2006.01)
(Continued)

(52) U.S. Cl.
CPC ............ *H04L 67/22* (2013.01); *G06F 16/903* (2019.01); *G06N 20/00* (2019.01); *G06Q 50/01* (2013.01); *H04L 51/32* (2013.01); *H04L 67/306* (2013.01)

(58) Field of Classification Search
CPC ....... H04L 67/22; H04L 67/306; H04L 51/32; H04L 51/26; G06F 16/903; G06F 16/9035; G06F 16/9038; G06N 20/00; G06Q 50/01
See application file for complete search history.

(56) References Cited

U.S. PATENT DOCUMENTS 6,233,571 B1 5/2001 Egger et al.
7,243,102 B1 7/2007 Naam et al.
(Continued)

OTHER PUBLICATIONS

Chang-Ling Hsu ; Chia-Ming Liu ; Tai-Ling Li. "A Big Data Fuzzy Grey Relational Analysis Method for social post retrieval—with an application to Facebook's news groups". 2017 International Conference on Applied System Innovation (ICASI) May 13-17, 2017.*
(Continued)

*Primary Examiner* — Gabrielle A McCormick
(74) *Attorney, Agent, or Firm* — Brian M. Restauro, Esq.; Wayne F. Reinke, Esq.; Heslin Rothenberg Farley & Mesiti P.C.

(57) ABSTRACT

Disclosed is a computer-implemented method, system and program product for prioritizing social media posts and recommending action(s) to a user for the prioritized of social media posts. The computer-implemented method includes monitoring, by the data processing system, interaction(s) of a user on social media accounts of the user, receiving, by the data processing system, input from the user including information about the user and goal(s) of the user with respect to the social media accounts, learning, by the data processing system, additional information about the user, and cognitively analyzing, by the data processing system, the interaction(s) of the user, the input from the user and the additional information about the user to derive preference(s) of the user regarding the social media accounts, the preference(s) including topic(s) of relevance to the user. The computer-implemented method further includes cognitively prioritizing, by the data processing system, social media post(s) from among the social media accounts based on the topic(s) of relevance and the user preference(s), the cognitively prioritizing resulting in prioritized social media posts, and cognitively recommending action(s) to the user based on
(Continued)

the prioritized social media posts, the topic(s) of relevance and the user preference(s).

20 Claims, 7 Drawing Sheets

(51) Int. Cl.
*G06Q 50/00* (2012.01)
*H04L 12/58* (2006.01)
*G06N 20/00* (2019.01)
*G06F 16/903* (2019.01)

(56) References Cited

U.S. PATENT DOCUMENTS

| | | | |
|---|---|---|---|
| 8,091,032 B2 | 1/2012 | Fischer | |
| 8,341,223 B1 | 12/2012 | Patton et al. | |
| 8,756,276 B2 | 6/2014 | Tseng et al. | |
| 2002/0045154 A1 | 4/2002 | Wood et al. | |
| 2007/0073748 A1 | 3/2007 | Barney | |
| 2007/0288433 A1 | 12/2007 | Gupta et al. | |
| 2009/0234727 A1 | 9/2009 | Petty | |
| 2011/0004831 A1 | 1/2011 | Steinberg et al. | |
| 2012/0166433 A1 | 6/2012 | Tseng | |
| 2013/0031489 A1* | 1/2013 | Gubin | G06Q 50/01 715/753 |
| 2013/0198204 A1 | 8/2013 | Williams et al. | |
| 2013/0290820 A1* | 10/2013 | Dhanani | G06Q 50/01 715/205 |
| 2013/0297694 A1 | 11/2013 | Ghosh | |
| 2013/0304818 A1 | 11/2013 | Brumleve et al. | |
| 2015/0032737 A1* | 1/2015 | Badenes | G06Q 50/01 707/723 |
| 2016/0292794 A1* | 10/2016 | Sedayao | G06F 16/951 |
| 2016/0299980 A1* | 10/2016 | Saini | G06F 16/9535 |
| 2017/0031915 A1* | 2/2017 | Moxon | H04L 67/306 |
| 2017/0316519 A1* | 11/2017 | Wang | G06Q 50/01 |
| 2018/0349500 A1* | 12/2018 | Tremblay | G06F 16/9535 |

OTHER PUBLICATIONS

Vanetti, M., et al., "Content-Based Filtering in On-Line Social Networks," Privacy and Security Issues in Data Mining and Machine Learning, PSDML 2010, Lecture Notes in Computer Science, vol. 6549, Springer, Berlin, Heidelberg, 7 pages. 2010.

Joaquin, D., et al., "Content-based collaborative information filtering: Actively learning to classify and recommend documents," Cooperative Information Agents II Learning, Mobility and Electronic Commerce for Information Discovery on the Internet, CIA 1998, Lecture Notes in Computer Science, vol. 1435, Springer, Berlin, Heidelberg. 1998.

Kokalitcheva, Kia, Instagram: Why Filtering in Social Media is Becoming Inevitable, fortune.com, 2 pages. Mar. 28, 2016.

Borne, Dr. Kirk, "Cognitive Analytics Answers the Question: What's Interesting in Your Data?", https://www.mapr.co/blog/cognitive-analytics-answers-question-whats-interesting-your-data, 3 pages. Mar. 2, 2016.

* cited by examiner

PRIORITIZING SOCIAL MEDIA POSTS AND RECOMMENDING RELATED ACTIONS

BACKGROUND

One or more aspects of the present disclosure relate, in general, to providing recommendations to users. More particularly, one or more aspects of the present disclosure relates to cognitively prioritizing social media posts across multiple social media accounts of the user and cognitively recommending actions to take relating to the prioritized social media posts.

End users are overwhelmed by information from social media. Social media statistics include, for example, for context as of July 2015, that the total worldwide population is 7.3 billion, the Internet has 3.17 billion users with 2.3 billion active social media users, 91 percent of retail brands use two or more social media channels, Internet users have an average of 5.54 social media accounts, social media users have risen by 176 million in the last year, and one million new active mobile social users are added every day (e.g., 12 per second). The user interest in filtering wanted/unwanted data continues to grow due at least in part from excess of information provided to users in the form of spam; searching for information of interest takes too much time or fails due to being buried by irrelevant data.

SUMMARY

Shortcomings of the prior art are overcome and additional advantages are provided through the provision, in one aspect, of a computer-implemented method for prioritizing social media posts and recommending actions for a user to take with regard to the prioritized social media posts. The method includes monitoring, by a data processing system, one or more interactions of a user on a plurality of social media accounts of the user, receiving, by the data processing system, input from the user comprising information about the user and one or more goals of the user with respect to the plurality of social media accounts, learning, by the data processing system, additional information about the user, cognitively analyzing, by the data processing system, the one or more interactions of the user, the input from the user and the additional information about the user to derive one or more preferences of the user regarding the plurality of social media accounts, the one or more preferences comprising at least one topic of relevance to the user, cognitively prioritizing, by the data processing system, a plurality of social media posts from among the plurality of social media accounts based on the at least one topic of relevance and the one or more user preferences, the cognitively prioritizing resulting in a plurality of prioritized social media posts, and cognitively recommending, by the data processing system, one or more actions to the user based on the plurality of prioritized social media posts, the at least one topic of relevance and the one or more user preferences.

In another aspect, a system is provided for prioritizing social media posts and recommending actions for a user to take with regard to the prioritized social media posts. The system may include, for example, memory(ies), at least one processor in communication with the memory(ies). Further, the system may include program instructions executable by the one or more processor via the memory to perform a method. The method may include, for example: monitoring, by a data processing system, one or more interactions of a user on a plurality of social media accounts of the user, receiving, by the data processing system, input from the user comprising information about the user and one or more goals of the user with respect to the plurality of social media accounts, learning, by the data processing system, additional information about the user, cognitively analyzing, by the data processing system, the one or more interactions of the user, the input from the user and the additional information about the user to derive one or more preferences of the user regarding the plurality of social media accounts, the one or more preferences comprising at least one topic of relevance to the user, cognitively prioritizing, by the data processing system, a plurality of social media posts from among the plurality of social media accounts based on the at least one topic of relevance and the one or more user preferences, the cognitively prioritizing resulting in a plurality of prioritized social media posts, and cognitively recommending, by the data processing system, one or more actions to the user based on the plurality of prioritized social media posts, the at least one topic of relevance and the one or more user preferences.

In a further aspect, a computer program product may be provided. The computer program product may include a storage medium readable by a processor and storing instructions for performing a method of prioritizing social media posts and recommending actions for a user to take with regard to the prioritized social media posts. The method may include, for example: monitoring, by a data processing system, one or more interactions of a user on a plurality of social media accounts of the user, receiving, by the data processing system, input from the user comprising information about the user and one or more goals of the user with respect to the plurality of social media accounts, learning, by the data processing system, additional information about the user, cognitively analyzing, by the data processing system, the one or more interactions of the user, the input from the user and the additional information about the user to derive one or more preferences of the user regarding the plurality of social media accounts, the one or more preferences comprising at least one topic of relevance to the user, cognitively prioritizing, by the data processing system, a plurality of social media posts from among the plurality of social media accounts based on the at least one topic of relevance and the one or more user preferences, the cognitively prioritizing resulting in a plurality of prioritized social media posts, and cognitively recommending, by the data processing system, one or more actions to the user based on the plurality of prioritized social media posts, the at least one topic of relevance and the one or more user preferences.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects of the present disclosure, a user's interactions with their multiple social media accounts may be monitored by a data processing system. Together with data regarding the user's social media interactions and information about the user provided by the user or otherwise learned about the user as input, a cognitive analysis may be performed by the data processing system to derive user preferences regarding individual social media accounts of the user, groups of social media accounts of the user or regarding the use of social media generally by the user. The cognitive analysis may also be used to derive topic(s) of relevance to the user. The user preferences and topic(s) of relevance derived may then be used by the data processing system to cognitively prioritize a number of social media posts (the number can be set in a variety of ways) on the user's social media accounts, resulting in an ordered list of social media posts.

The prioritized social media posts may then be used by the data processing system to cognitively recommend actions for the user to take regarding the prioritized social media posts. The actions can include, for example, which posts in the ordered list to read and in what order, the posts being summarized, for example, and, for example, providing a sense of urgency for some or all of the social media posts on the ordered list using, for example, text, visual cues (e.g., color, flashing, etc.) and/or audible cues (e.g., an alarm sound or other tone).

As used herein, the term "relationship profile" refers to characteristics of a user relating to relationships. Some examples include marital status, whether the user has any children, whether the user has any pets and one or more friends or family of the user.

As used herein, the term "image" refers to a post including visual aspects, such as, for example, a still image or photograph, a series of images (e.g., a Graphics Interchange Format or GIF), a video, augmented reality and virtual reality. An image may or may not include any text.

Figure 1:
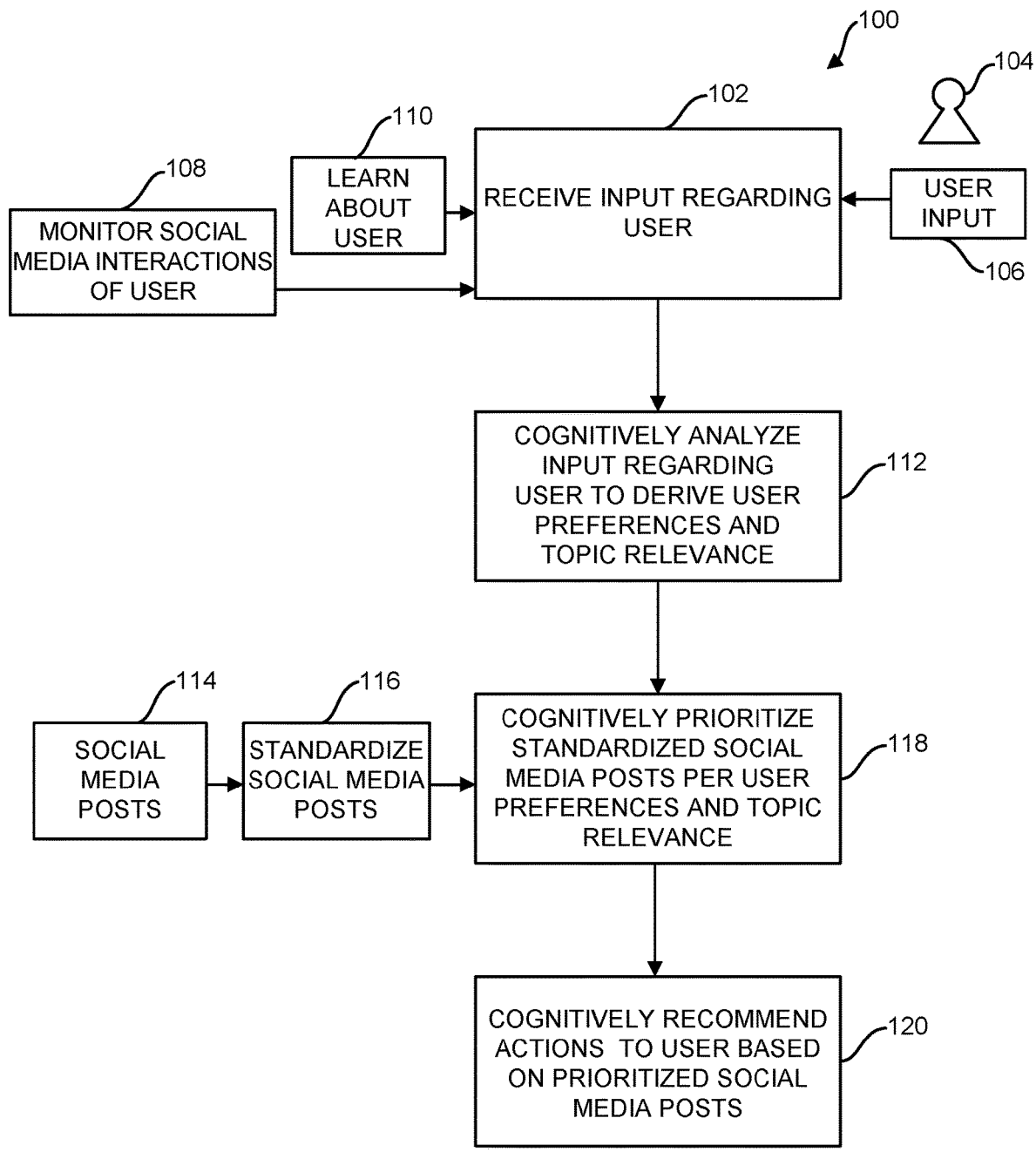
FIG. 1 is a flow diagram of one example of a computer-implemented method for prioritizing social media posts on a plurality of social media accounts of a user and recommending actions for the user to take with respect to the prioritized social media posts, in accordance with one or more aspects of the present disclosure.

FIG. 1 is a flow diagram 100 of one example of a computer-implemented method for prioritizing social media posts on a plurality of social media accounts of the user and recommending actions for the user to take for with regard to prioritized social media posts, in accordance with one or more aspects of the present disclosure.

The method begins with a data processing system receiving input 102 regarding a user 104. The input may include, for example, user input 106, monitoring 108 social media interactions of the user and learning 110 additional information about the user. The user provides some basic personal information along with goals of the user with respect to his or her social media accounts. Examples of basic personal information may include, for example, name, address, contact information and an identification of all or chosen ones of the user's social media accounts to include. Input received from a user about goals related to social media can take many forms. In one example, the user may have a goal of spending no more than a predetermined amount of time on social media generally (e.g., three hours per week). In another example, the user may have time-limit goals for individual social media accounts, which may be different from other social media accounts. In still another example, the user may have a goal based on a number of posts read in a given time frame. For example, the user may set a limit on the number of posts read across all their social media accounts or have different limits for one, some or all the social media accounts. In yet another example, the user may have a goal based on the type of post. For example, a user goal may be a limit on a number of pictures (with or without captions) viewed. The limit could be more granular, limiting a type of picture, for example, animal photos.

Monitoring social media interaction(s) on social media accounts of the user provides various insights into the habits of the user when reading social media posts. For example, the system can learn whose posts the user wants to see, what types of topics the user likes/wants to see, what types of posts the user skips (e.g., because the user finds the type of posts boring), what, if any, types of jokes the user likes, what types of images the user likes/wants to see, etc. Monitoring interactions of a user on multiple social media accounts of the user may also include, for example, how long the user spends on each social media account, how long the user spends reading posts, the type of posts read and a time and date for each post read.

The information about the user includes, for example, user characteristics and which social media accounts the user has. The characteristics of the user can include, for example, any physical traits. The characteristics can also include, for example, nationality, gender, age, marital status, children, pets, hobbies and interests. The characteristics of the user can further include personality traits, for example, outgoing, introverted, openness, friendliness, conscientiousness, agreeableness, etc.

The system cognitively analyzes 112 the input received regarding the user to derive user preferences and topics of relevance to the user. Cognitively analyzing to derive user preference(s) may include considering diverse types of information, such that, in one example, the information is standardized for processing. The standardized social media posts may then be cognitively analyzed to derive user preference(s) with regard to the particular social media accounts of the user or user preference(s) with regard to social media more generally.

As a practical matter, since social media posts 114 may differ in format, content, language, etc., among the different providers, standardizing 116 the posts and other input for analysis may be in order to accomplish standardization.

The system then cognitively prioritizes 118 the standardized social media posts in accordance with the derived user preferences and the user's topic of relevance. Based on the prioritized social media posts and other information known about the user, the system cognitively recommends 120 action(s) for the user to take with respect to the cognitively prioritized social media posts. For example, the system may recommend that the user read a particular post first, second, third, etc. As another example, the system may alert the user to posts by favorite contacts (e.g., family, spouse, close friends, long-term friends, etc.). As still another example, the system may provide a level of urgency to one or more posts (e.g., respond immediately, read immediately, read in the next day or two, etc.) As output of the system may also include, for example, a summary of each of the top cognitively prioritized posts, e.g., the top 10.

In one example, a cognitive computer system may perform the cognitive analysis. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

In one example, text in social media posts may be interpreted using Natural Language Understanding (previously known as "Natural Language Processing.") and Natural Language Classification. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, one or more APIs (Application Programming Interfaces) of an artificial intelligence platform, one can send text from these sources to a natural language classifier trained using machine learning techniques. The classifier will return, for example, its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining a natural language classifier service with a conversation service if the application is to engage in a conversation with a user; and classifying frequently asked questions (FAQs).

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Figure 2:
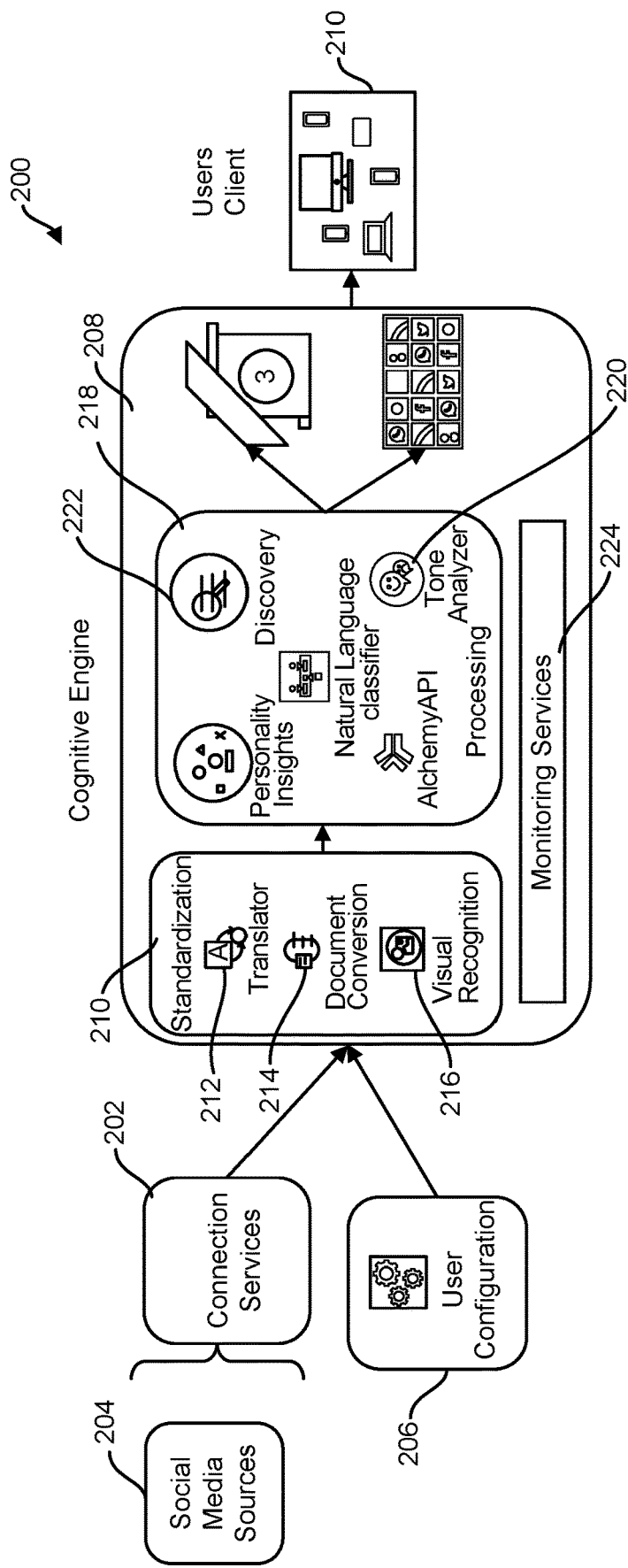
FIG. 2 is a combination block diagram and flow diagram 200 for one example of a process and system for recommending actions for a user to take with regard to prioritized social media posts across multiple social media accounts of the user, in accordance with one or more aspects of the present disclosure.

FIG. 2 is a combination block diagram and flow diagram 200 for one example of a process and system for cognitively prioritizing social media posts of the user's multiple social media accounts and recommending actions for the user to take with regard to the prioritized social media posts. In one example, one or more connection services 202 provide access to social media sources 204 corresponding to the multiple social media accounts of a user. In another example, one or more of the social media sources may provide an integrated connection service. In another example, the connection service is a third-party provider. Through user configuration module 206, the user provides some basic personal information and goals of the user with respect to social media accounts. The social media source connections and the user information and goals are provided to cognitive engine 208.

The cognitive engine 208 includes several modules and submodules. Module 210 standardizes all the input from the social media sources of the user and information from/about the user. Various aspects of standardization may be included, for example, one or more translators for standardization of, e.g., language, units of measure, time (e.g., a time zone), etc. Standardization may also involve document format standardization. For example, document format standardization may include converting images to a predetermined format, size, quality, etc., converting text document types to a common format; and visual recognition of images and/or aspects of images, for example, identifying people, animals, location, content and other identifiable items within an image. As such, the various aspects of standardization may be considered pre-processing of the social media posts. Module 210 includes submodules 212, 214 and 216. Submodule 212 translates languages. In one example, text of the user or a post on the user's social media accounts may be cognitively analyzed to dynamically translate one language to another. The cognitively analyzing may, in one example, be performed using cognitive computing. In addition, language translation as part of the cognitively analyzing may utilize a cognitive computing service, accessed, in one example, using an Application Programming Interface (API) and, e.g., a JAVA® application.

Submodule 214 performs document conversion, for example, from one format to another format predetermined as the standard. In one example, documents of a user may be cognitively searched, analyzed and/or converted. The cognitively searching, analyzing and/or converting may, in one example, be performed using cognitive computing. In addition, the cognitively searching, analyzing and/or converting may utilize a cognitive computing service, accessed, in one example, using an Application Programming Interface (API) and, e.g., a JAVA® application, in order to perform cognitive searching and a content analytics engine to enable applications to identify patterns, trends and actionable insights that drive better decision-making. Such a service may also, for example, securely unify structured and unstructured data with pre-enriched content, and, for example, use a simplified query language to eliminate the need for manual filtering of results.

Submodule 216 performs visual recognition, which may include, for example, the use of face detection and other detection schemes. In one example, images may be cognitively analyzed to understand what is shown in the images, for example, faces, scenes, objects, animals, etc. The cognitively analyzing may, in one example, be performed using cognitive computing. In addition, the cognitively analyzing may utilize a cognitive computing service, accessed, in one example, using an Application Programming Interface (API) and, e.g., a JAVA® application.

The standardized data may then be provided to another module, for example, a processing module 218, which may perform various functions on the standardized information. In one example, the processing module may include functions such as, for example, deriving personality traits of the user, analyzing text of the user and ranking of social media posts on social media accounts of the user. In one example, text of the user may be cognitively analyzed to derive one or more personality traits of the user. The cognitively analyzing may, in one example, be performed using cognitive computing. In addition, the cognitively analyzing may utilize a cognitive computing service, accessed, in one example, using an Application Programming Interface (API) and, e.g., a JAVA® application, to gain insight regarding personality traits.

In one example, text of a user may be cognitively analyzed using Natural Language Understanding and Natural Language Classification. The cognitively analyzing may, in one example, be performed using cognitive computing. In addition, the cognitively analyzing may utilize a cognitive computing service for Natural Language Classification, accessed, in one example, using an Application Programming Interface (API) and, e.g., a JAVA® application. The Natural Language Classifier service applies cognitive computing techniques to return the best matching classes for a sentence or phrase. For example, you submit a question and the service returns keys to the best matching answers or next actions for your application. You create a classifier instance by providing a set of representative strings and a set of one or more correct classes for each training. After training, the new classifier can accept new questions or phrases and return the top matches with a probability value for each match. Another example of a natural language understanding service is Alchemy API (Denver, Colo.). Alchemy API uses machine learning to do natural language processing and computer vision for its clients both over the cloud and on-premises.

Returning to FIG. 2, processing module 218 may further include, for example, a tone analysis submodule 220. In one example, text of a user may be cognitively analyzed to determine a tone of the user. The cognitively analyzing may, in one example, be performed using cognitive computing. In addition, the cognitively analyzing may utilize a cognitive computing service to analyze tone, accessed, in one example, using an Application Programming Interface (API) and, e.g., a JAVA® application. Such a tone analyzer service may, for example, leverage cognitive linguistic analysis to identify a variety of tones at both the sentence and document level. This insight can then be used to refine and improve communications. It detects three types of tones, including emotion (anger, disgust, fear, joy and sadness), social propensities (openness, conscientiousness, extroversion, agreeableness, and emotional range), and language styles (analytical, confident and tentative) from text. Processing module 218 may further include, for example, a ranking submodule 222 for ranking the social media posts using the results of the other four submodules. In one example, the function of ranking may be performed using cognitive computing techniques. In one example, the ranking may utilize a cognitive computing service accessed, in one example, using an Application Programming Interface (API) and, e.g., a JAVA® application. Also included in the cognitive engine 208 is a user monitoring module 224 that actively monitors the user's usage of social media as pre-approved by the user. Monitoring social media interaction(s) on social media accounts of the user provides various insights into the habits of the user when reading social media posts. For example, the system can learn whose posts the user wants to see, what types of topics the user likes/wants to see, what types of posts the user skips (e.g., because the user finds the type of posts boring), what, if any, types of jokes the user likes, what types of images the user likes/wants to see, etc. Monitoring interactions of a user on multiple social media accounts of the user may also include, for example, how long the user spends on each social media account, how long the user spends reading posts, the type of posts read and a time and date for each post read.

The output of the processing module is an ordered list 226 of social media posts, taking into account the user preferences, priorities as to content and all other information known about the user. The ordered list is then made available and/or sent to a client 228 of the user, meaning any device capable of receiving and conveying the list to the user (e.g., a PC, a smartphone, a tablet, a laptop computer, etc.). A number of posts to be included in the ordered list may be based on, for example, a number of posts chosen for or chosen by the user, including, for example, any number from two posts to all posts. In one example, the user chooses a number of posts to be shown as part of user configuration 206 in FIG. 2. In another example, the number of posts in the ordered list can be based on time (e.g., all posts for the last three days) or the ordered list can be contextual. For example, all posts from a user's spouse, child or parent may be included, regardless of the number and/or regardless of the date of each post. In another example, posts from anyone on a user's "favorites" or similar social media list may be included, regardless of the number. In still another example, the number of posts in the ordered list can be based on the type of post, for example, a number of image (or visual) posts, a number of humorous posts chosen by or for the user, a number of new posts, etc.

Figure 3:
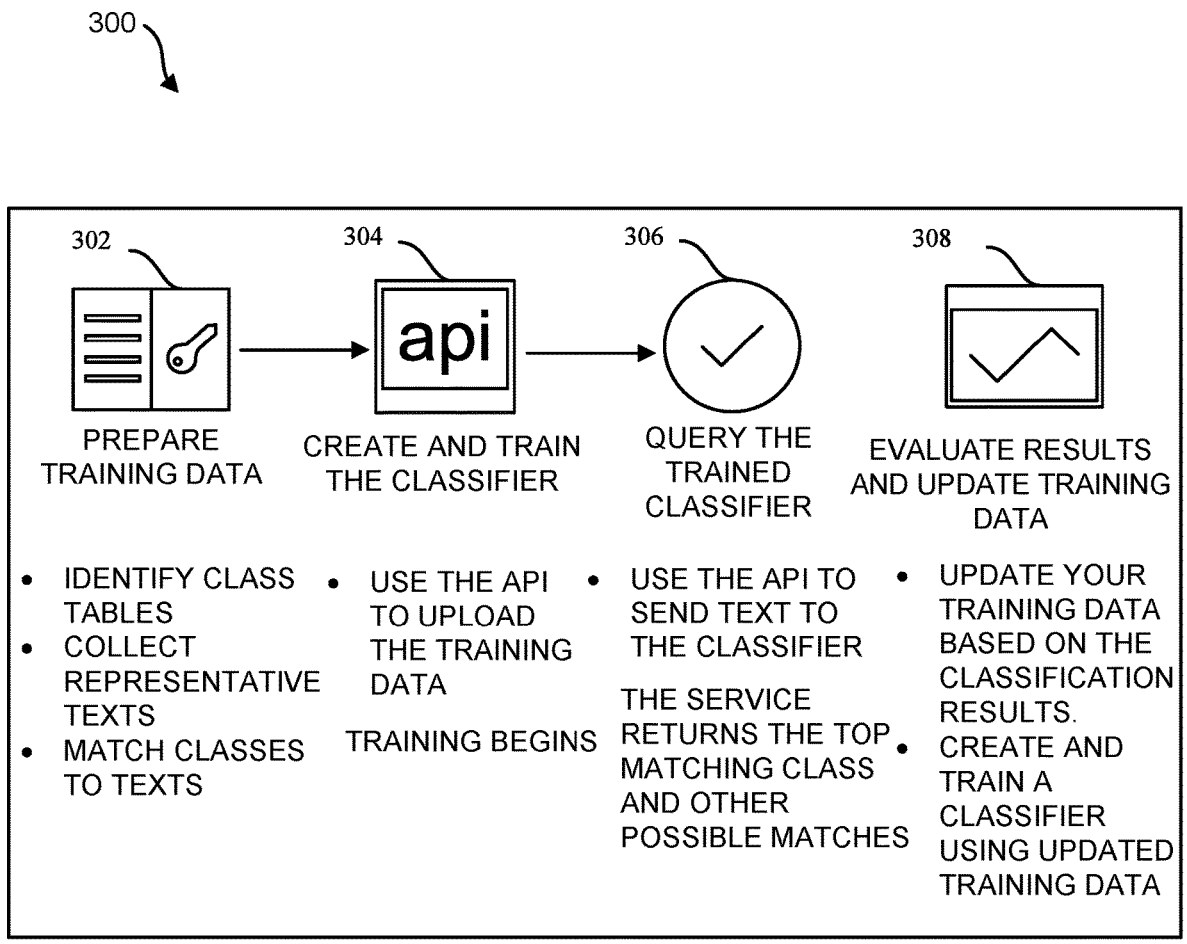
FIG. 3 depicts one example of creating and using a natural language classifier, in accordance with one or more aspects of the present disclosure.

FIG. 3 is a hybrid flow diagram 300 of one example of an overview of the basic steps for creating and using a natural language classifier service. Initially, training data for machine learning is prepared, 302, by identifying class tables, collecting representative texts and matching the classes to the representative texts. An API (Application Planning Interface) may then be used to create and train the classifier 304 by, for example, using the API to upload training data. Training may begin at this point. After training, queries can be made to the trained natural language classifier, 306. For example, the API may be used to send text to the classifier. The classifier service then returns the matching class, along with other possible matches. The results may then be evaluated and the training data updated, 308, for example, by updating the training data based on the classification results. Another classifier can then be trained using the updated training data.

Figure 4:
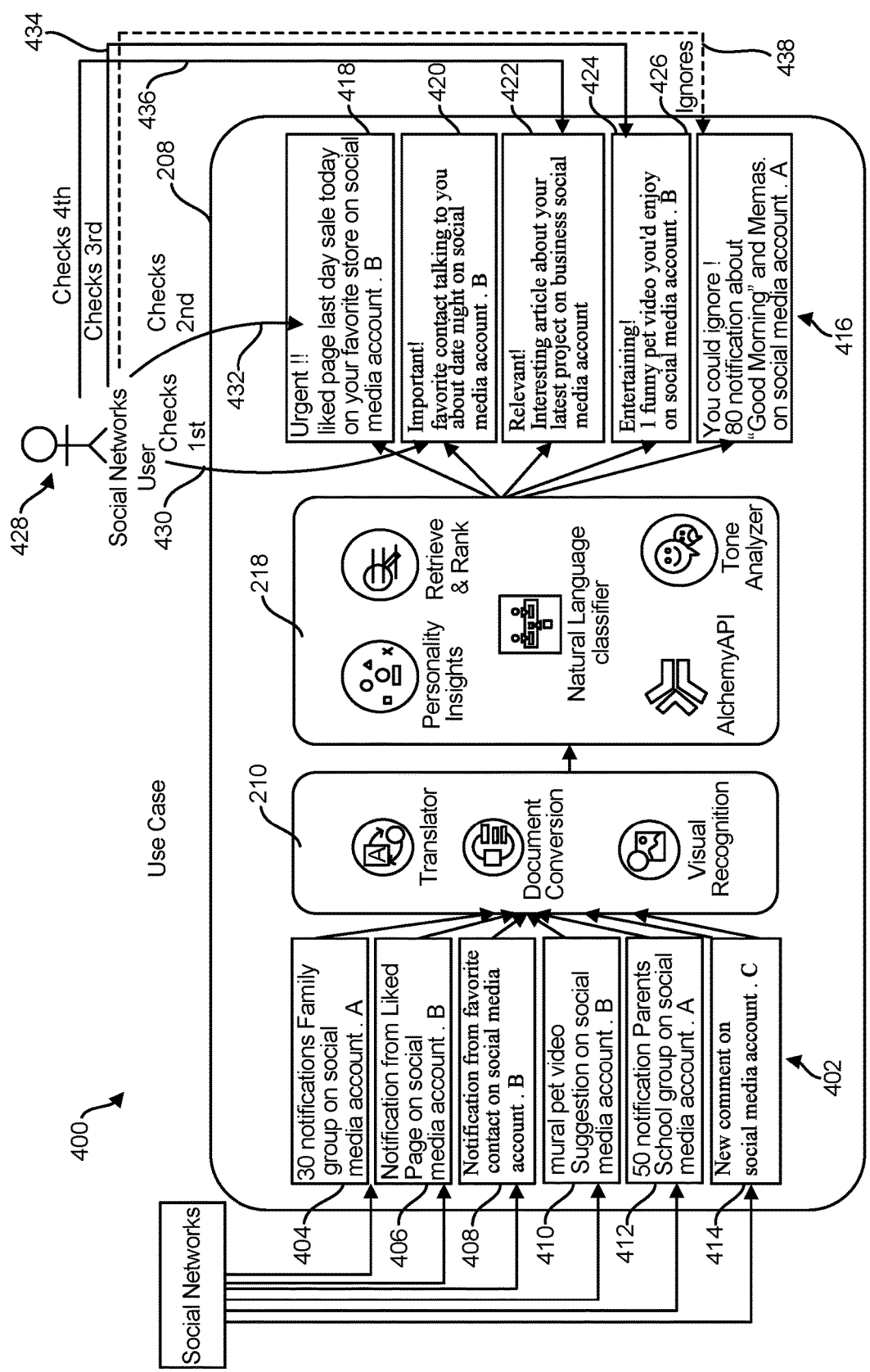
FIG. 4 is a modified flow/block diagram for one example of a use case for the cognitive engine of FIG. 2, in accordance with one or more aspects of the present disclosure.

FIG. 4 is a combined block diagram and flow diagram 400 of one example of a use case for the cognitive engine 208 of FIG. 2. In one example, the standardized input 402 to the cognitive engine may include, for example, multiple (e.g., 30) notifications 404 from a family group in a user's social media account A. The input may further include, for example, a notification 406 from a "liked" page on the user's social media account B. The input to the cognitive engine may further include, for example, a notification 408 from a "favorite" contact on the user's social media account B. The input may further include, for example, a suggestion 410 of a mural pet video to view. The input to the cognitive engine may further include, for example, multiple (e.g., 50) notifications 412 from a parent's school group on the user's social media account A. The input may further include, for example, a notification 414 of a new comment on the user's social media account C.

The output 416 of the cognitive engine includes, for example, an ordered list of selected posts from the standardized input. For example, listed first is a notification 418 that the user's liked page on social media account B mentions today as a last day of a sale at one of the user's favorite stores. Further, the last day sale notification includes a sense of urgency with "Urgent!!" and may, in one example, also or instead be colored (or otherwise visually emphasized and/or audibly emphasized) for urgency, e.g., red and/or an alarm sound. Next listed is a notification 420 that a favorite contact on the user's social media account B is talking about date night. Another sense of urgency is provided for the post with the notation "Important!," which is intended in this example to be lower on the urgency scale than "Urgent!!" used for the first notification of the output of the cognitive engine. Further, in one example, the more moderate sense of urgency may be reflected using color (e.g., yellow) or otherwise visually emphasized and/or audibly emphasized. Next listed is a notification 422 of an article on a business social network account of the user regarding the user's latest project. This listing also conveys yet a lower level of urgency with "Relevant!," and, in one example, may reflect the lower level using color (e.g., green) or otherwise visually emphasized and/or audibly emphasized. Next on the list is a notification 424 of a funny pet video the user is predicted to enjoy (e.g., based on past behaviors) on the user's social media account B. Note that a sense of interest is provided with the addition of "Entertaining!," and, for example, since not considered urgent, no color or other emphasis may be used. Finally, grouped together in notification 426 are multiple similar posts (e.g., 80) regarding common topics or themes; here, "Good Morning" wishes and memes. Note that a sense of interest is provided with the addition of "You Could Ignore!," and, for example, since there is no sense of urgency, in one example, no color or other emphasis may be used.

Also shown in FIG. 4 is one example of a user 428 going through the output 416 with recommended actions and prioritized social media posts. As shown, the user first checks 430 post 420 regarding date night and a favorite contact on social media B. The user then checks 432 the notification 418 regarding a last-day sale as a favorite store of the user on social media account B of the user. The user third checks 434 the entertaining post 424 with a funny pet video. Next, the user checks 436 the relevant post 422 regarding an article of interest on LinkedIn. Lastly, the user ignores 438 the bundle of posts 426 on social media A recommended to be ignored. Note that the user reviewed the ordered posts in a different order than recommended, but the user did take the recommendation to ignore the bundle of posts regarding good morning wishes and memes. Tracking the user interactions with their social media accounts is beneficial to refine the user preferences and topic priority. In one example, the information known about a user may be stored in a database and new social media interactions of the user used to refine the recommendations using, for example, machine learning.

Providing the cognitive recommendations may include searching cross co-occurrence matrices in making the cognitive recommendations. Based, at least in part, on the user behaviors and the items interacted with, a subsequent behavior of the user is predicted in real-time during the visit. The prediction may be made employing a predictive model trained using machine learning. The cognitive recommendations correspond to items not yet interacted with by the user and are provided to the user in real-time based, at least in part, on the predicted behavior of the user and the items interacted with by the user. The cognitive recommendations may be continually or periodically updated during the user's visit to the venue. The monitoring, predicting and providing the cognitive recommendations are performed by a processor, in communication with a memory storing instructions for the processor to carry out the monitoring, predicting and providing of cognitive recommendations to the user.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, the term "cognitively [function]," for example, cognitively analyzing, and formatives thereof refer to the use of cognitive computing in making recommendations to users regarding action(s) to take with regard to prioritized social media posts. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

A cognitive recommendation may be, for example, continually or periodically updated and made available to the user. The recommendation can be presented, for example, through a display-based connected device, e.g., a computer, laptop, tablet, smartphone, hologram, augmented reality, virtual reality, etc. The display-based connected device may be, for example, interactive with users. The recommendation to the user may be, for example, in the form of a push message (with or without an image or video component) or updated website or app interaction. Periodically, updated social media interactions of the user, user input and additional information about the user learned may then be used to retrain the system and create a new cross co-occurrence (CCO) model and matrices to drive the recommendations using existing software such as, for example, APACHE MAHOUT™ from The APACHE® Software Foundation (Wakefield, Mass.).

In one example, a simple co-occurrence algorithm may be described using an equation:

$$r=[A^tA]h_a$$

where "r" is a recommendation; "$h_a$" is a user's history of some primary action (e.g., a purchase history); "A" is a history of all users' primary actions and, in one example, matrix "$A^tA$" compares column to column using, for example, a log-likelihood based correlation test. In addition, all information known about a user (e.g., in-venue behaviors) can be used to find correlations between different behaviors, known as a cross-occurrence, information such as, for example, purchase behavior, view behavior, category-preference, location-preference, device-preference, etc. For example, the basic equation can be expanded for different behaviors:

$$r=[A^tA]h_a+[A^tB]h_b+[A^tC]h_c$$

where $h_a$-$h_c$ are user histories of different primary actions or behaviors.

In one embodiment, a system to facilitate a computer-implemented method of providing recommendations can include at a high level, for example, a front end, a back end, a backbone and a search engine. A "front end" in this context refers to an intake module for user behavior and related data. In one example, the front end can be APACHE MAHOUT™ by The APACHE® Software Foundation (Wakefield, Mass.), which is a distributed linear algebra framework and mathematically expressive domain specific language. It serves as a scalable machine-learning library. A "back end" in this context refers to a cluster-computing framework; it is a general purpose "big data" processing engine. Some common uses of such a back end include, for example, interactive queries across large data sets and machine learning. A "backbone" in this context refers to software for use with big data analytics. In one example, HADOOP™ by The APACHE® Software Foundation can serve as the backbone. A "search engine" in this context refers to a large-scale enterprise search platform, for example, SOLR™ by The APACHE® Software Foundation.

In one example, the social media interactions of the user may be input into one or more cross co-occurrence matrices and used to do a search (i.e., a cross co-occurrence query) for similar interactions by other users. The results of the search are then used as part of formulating a recommendation.

As the user social media interactions database grows, machine learning may be periodically repeated to further train (or retrain) the system and create new cross co-occurrence model and matrices to drive recommendations, for example, using existing APACHE MAHOUT™ by The APACHE® Software Foundation.

In one or more embodiments, a database may store various data, for example, data regarding user interaction with social media accounts of a user, or, as another example, decision data structures for use in providing artificial intelligence (AI) decisions, for example, cognitively analyzing information about the user, including the user interactions with the user's social media accounts to derive preferences of the user, cognitively prioritizing social media posts from the social media accounts of the user and/or cognitively recommending actions for the user to take with regard to the cognitively prioritized social media posts.

In one embodiment, the cognitive engine 208 of FIG. 2 may, for example, use a decision data structure that predicts one or more behaviors of users with respect to user interactions with their social media accounts. Such a decision data structure may include, for example, user behavior "norms," which may include, for example, most frequent user social media behaviors in the aggregate and/or such behavioral data of an individual user, a group of users or all users.

A plurality of instances of such a decision data structure may in one embodiment, be run in parallel, each instance for a different user. For each instance of the decision data structure, such behavior norms can differ. A machine learning process, in one example, may continually or periodically update the behavioral data and/or user behavior norms of the different instances of the decision data structure. Behavioral data of one, some or all the users may be monitored to establish and update the different data structures, including, for example, the behavioral norms.

Performing Natural Language Understanding (NLU) can include one or more of topic classification to determine topics of social media posts in the user's social media accounts, a sentiment analysis process which determines a sentiment parameter for a message, e.g. polar sentiment NLU output parameters, "negative," "positive," and/or non-polar NLP output sentiment parameters, e.g. "anger," "disgust," "fear," "joy," and/or "sadness" or other classification process for output of one or more other NLU output parameters e.g. one of more "social tendency" NLU output parameter or one or more "writing style" NLU output parameter.

In one example, performing the Natural Language Understanding may include one or more of (a) topic classification and output of one or more topic NLU output parameter for a social media post, (b) sentiment classification and output of one or more sentiment output parameter for a post, and (c) other NLU classifications and output of one or more other NLU output parameters for a post.

Topic analysis for topic classification may include topic segmentation to identify several topics within a post. Topic analysis can apply a variety of technologies, e.g., one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Disclosed herein is a cognitive method and system that determines and filters information that may or may not be relevant to the user of all social networks that the user is subscribed to, it learns the user's interests and what the user considers relevant based on the user's personality, professional profile, circumstances in a given time period, among others. This, in order to make suggestions to the user of actions to take with regard to posts from social media accounts of the user, for example, which notification/post/feed/article to read first and which the user might want to ignore (categorizing topics and type of contact, for example).

Disclosed is a method and system that recommends prioritization between multiple social media accounts by learning users social media patterns. The system may learn users' interaction on several social media accounts for understanding users' interests through the time.

In one embodiment, the system learns user preferences to assist in determining prioritization between social media posts on multiple social media platforms subscribed to by the user. For example, if the user enjoys to see visual posts (e.g., still images, videos, etc.) more than reading business articles, the system is going to recommend posts on a social media platform focused on visual posts.

In one embodiment, the system may recommend to check a viral post within the categories the user enjoys based on his profile, even though the user does not usually check the given social network at this particular time of the day. For example, if there were some popular pictures (e.g., measured by a number of likes or views) posted recently, then it will recommend that the user views those pictures instead of seeing entertainment on another social media platform.

In one embodiment, the system may learn from user interactions with social media posts to determine, in real time, which social media platform(s) may meet the user's expectations. For example, if the user likes to read articles in the morning and see entertainment posts at night, it may prioritize them according to the time of the day.

In one embodiment, the system may recommend that a user distribute their time on multiple social media platforms based on the user's goals. For example, if one user's goal is to spend 60% of their time on social media reading articles, the system may recommend posts on different social networks that allow the user to meet that goal.

The cognitive engine 208 (FIG. 2) uses three basic steps to process the social media posts: Standardization: is a layer where all the different input formats are modified to be used for the next layer. It has visual recognition capabilities, translator and document conversion features; Processing: all the standardized input is processed to determine which one is relevant or not. It will take in consideration, but not limited to, aspects such as location, the actual source, the day of the week, the time, and fundamentally, the insight obtained from the usage of the user of the regular applications; and Output: will provide the list of featured content and the list of the bulk or original content. This cognitive engine also has a monitoring component, which is responsible for the on-going learning activity, for instance, based on the actual interaction of the user in the social networks, the profile of preferences may be updated, modified or overwritten.

The User Client is the final place where the user can consume the output of the cognitive engine. In one example, the user client refers to a user computer running a local application, server-based online application or cloud-based application. In another example, the user client refers to a smart phone or other personal computing device running an application, for example, an Android or iOS based smart phone or tablet.

Certain embodiments herein may offer various technical computing advantages involving computing advantages to address problems arising in the realm of computer networks. Particularly, the end user problem of receiving too much information on the user's social media accounts. Embodiments herein can include, for example, cognitively prioritizing, by the data processing system, a plurality of social media posts from among the plurality of social media accounts based on the at least one topic of relevance and the one or more user preferences, the cognitively prioritizing resulting in a plurality of prioritized social media posts. Embodiments herein can include, for example, cognitively recommending, by the data processing system, one or more actions to the user based on the plurality of prioritized social media posts, the at least one topic of relevance and the one or more user preferences. Various decision data structures can be used to drive artificial intelligence (AI) decision making, such as decision data structure that cognitively analyzes, by the data processing system, using such decision data structures, a plurality of social media posts from among the plurality of social media accounts based on topic(s) of relevance to the user and the one or more user preferences. In another example, embodiments herein can include decision data structures for cognitively prioritizing, by the data processing system, the social media posts, resulting, for example, in an ordered list of prioritized social media posts. In another example, embodiments herein can include decision data structures for cognitively recommending, by the data processing system, one or more actions for the user to take with respect to the prioritized social media posts, the topic(s) of relevance and the user preference(s).

Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

In a first aspect, disclosed above is a computer-implemented method. The computer-implemented method includes monitoring, by a data processing system, interaction(s) of a user on social media accounts of the user, receiving, by the data processing system, input from the user including information about the user and goal(s) of the user with respect to the social media accounts, learning, by the data processing system, additional information about the user, cognitively analyzing, by the data processing system, the interaction(s) of the user, the input from the user and the additional information about the user to derive preference(s) of the user regarding the social media accounts, the preference(s) including at least one topic of relevance to the user, cognitively prioritizing, by the data processing system, social media posts from among the social media accounts based on the topic(s) of relevance and the user preference(s), the cognitively prioritizing resulting in prioritized social media posts, and cognitively recommending, by the data processing system, action(s) to the user based on the prioritized social media posts, the topic(s) of relevance and the user preference(s).

In one example, the monitoring may include, for example, one or more of tracking a time spent by the user on each of the social media accounts, tracking a time the user spends reading posts, tracking a type of each post read by the user, the type including one or more of text, audio and visual, and tracking a time and date of each post read by the user.

In one example, the input from the user in the computer-implemented method of the first aspect may include, for example, one or more of a time-related goal, a goal regarding an individual social media account, a goal related to a number of posts read and a goal related to a type of post.

In one example, the additional information about the user in the computer-implemented method of the first aspect may include, for example, at least one of a physical characteristic, a personality trait, a professional profile, a relationship profile, a location of the user and topics of interest to the user.

In one example, the cognitively prioritizing in the computer-implemented method of the first aspect may include, for example, standardizing the social media posts for processing, the standardizing resulting in standardized posts. In one example, the standardizing may include, for example, one or more of translating a language into a predetermined language, converting a document into a predetermined format and visual recognition to identify characteristic(s) of a visual post.

In one example, the cognitively prioritizing may include, for example, cognitively prioritizing the standardized social media posts based on the topic(s) of relevance to the user and the user preference(s).

In one example, the computer-implemented method may further include, for example, providing a level of urgency regarding post(s) of the standardized posts. In one example, the action(s) may include, for example, at least one of an order of viewing one or more of the social media posts and alerting the user to post(s) from favorite contacts.

In one example, the computer-implemented method of the first aspect may further include, for example, refining the user preference(s) using machine learning.

In a second aspect, disclosed above is a system. The system includes a memory, and processor(s) in communication with the memory to perform a method. The method includes monitoring, by a data processing system, interaction(s) of a user on social media accounts of the user, receiving, by the data processing system, input from the user including information about the user and goal(s) of the user with respect to the social media accounts, learning, by the data processing system, additional information about the user, cognitively analyzing, by the data processing system, the interaction(s) of the user, the input from the user and the additional information about the user to derive preference(s) of the user regarding the social media accounts, the preference(s) including topic(s) of relevance to the user, cognitively prioritizing, by the data processing system, social media posts from among the social media accounts based on the topic(s) of relevance and the user preference(s), the cognitively prioritizing resulting in prioritized social media posts, and cognitively recommending, by the data processing system, action(s) to the user based on the prioritized social media posts, the topic(s) of relevance and the user preference(s).

In one example, the cognitively prioritizing may include, for example, standardizing the social media posts for processing, the standardizing resulting in standardized posts. In one example, the standardizing may include, for example, one or more of translating a language into a predetermined language, converting a document into a predetermined format and visual recognition to identify one or more characteristics of a visual post. In another example, the cognitively prioritizing may include, for example, cognitively prioritizing the standardized social media posts based on the topic(s) of relevance to the user and the user preference(s). In yet another example the system may further include, for example, providing a level of urgency regarding post(s) of the standardized posts.

In a third aspect, disclosed above is a computer program product. The computer program product includes a non-transitive storage medium readable by a processor and storing instructions for performing a method of sending notifications. The method includes monitoring, by a data processing system, interaction(s) of a user on social media accounts of the user, receiving, by the data processing system, input from the user including information about the user and goal(s) of the user with respect to the social media accounts, learning, by the data processing system, additional information about the user, cognitively analyzing, by the data processing system, the interaction(s) of the user, the input from the user and the additional information about the user to derive preference(s) of the user regarding the social media accounts, the preference(s) including topic(s) of relevance to the user, cognitively prioritizing, by the data processing system, social media posts from among the social media accounts based on the topic(s) of relevance and the user preference(s), the cognitively prioritizing resulting in prioritized social media posts, and cognitively recommending, by the data processing system, action(s) to the user based on the prioritized social media posts, the topic(s) of relevance and the user preference(s).

In one example, the cognitively prioritizing may include, for example, standardizing the social media posts for processing, the standardizing resulting in standardized posts. In one example, the standardizing may include, for example, one or more of translating a language into a predetermined language, converting a document into a predetermined format and visual recognition to identify one or more characteristics of a visual post.

In one example, the cognitively prioritizing may include, for example, cognitively prioritizing the standardized social media posts based on the topic(s) of relevance to the user and the user preference(s).

In one example, the computer-implemented method of the first aspect may further include, for example, providing a level of urgency regarding at least one post of the plurality of standardized posts.

Figure 5:
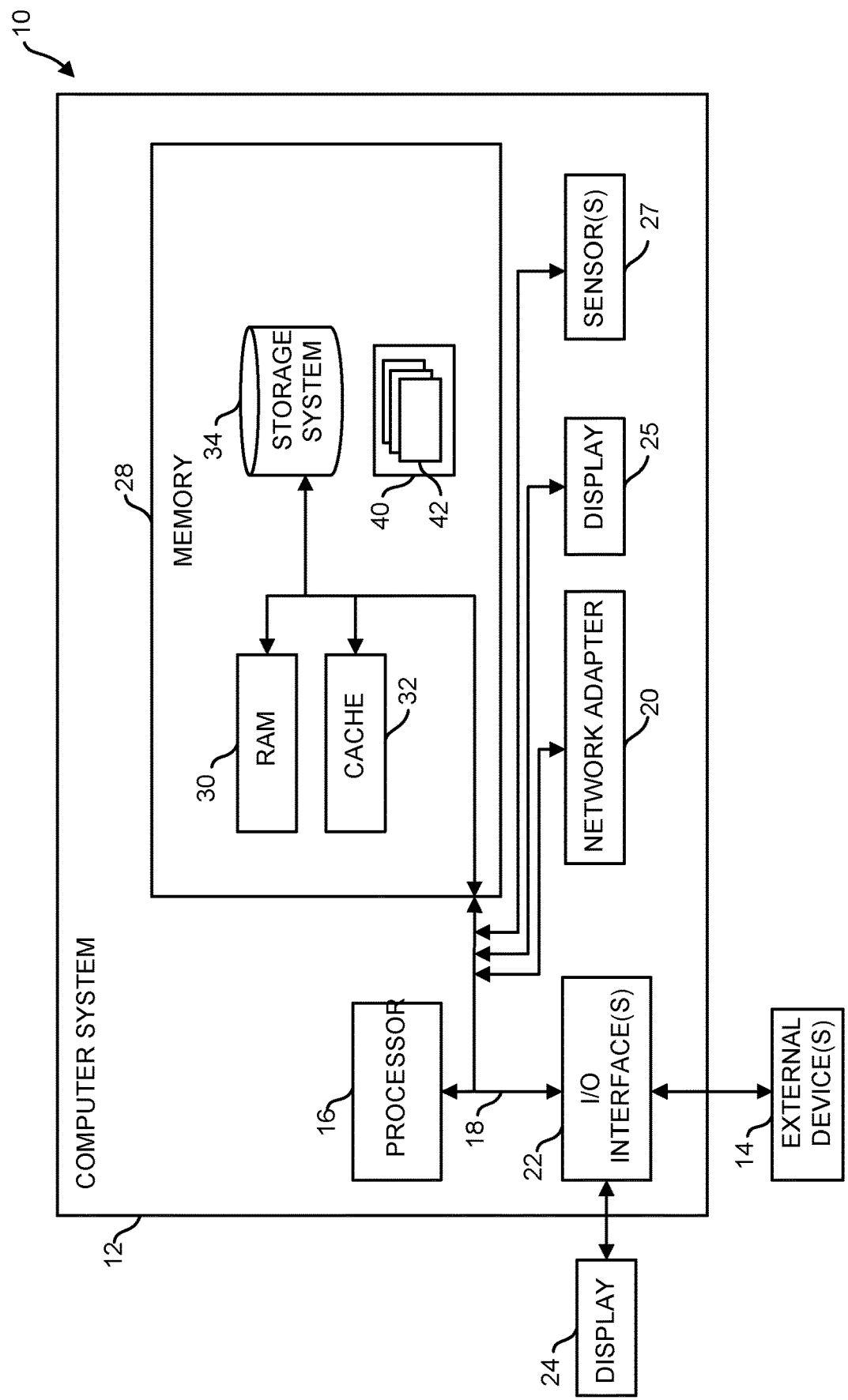
FIG. 5 is a block diagram of one example of a computer system, in accordance with one or more aspects of the present disclosure.
Figure 6:
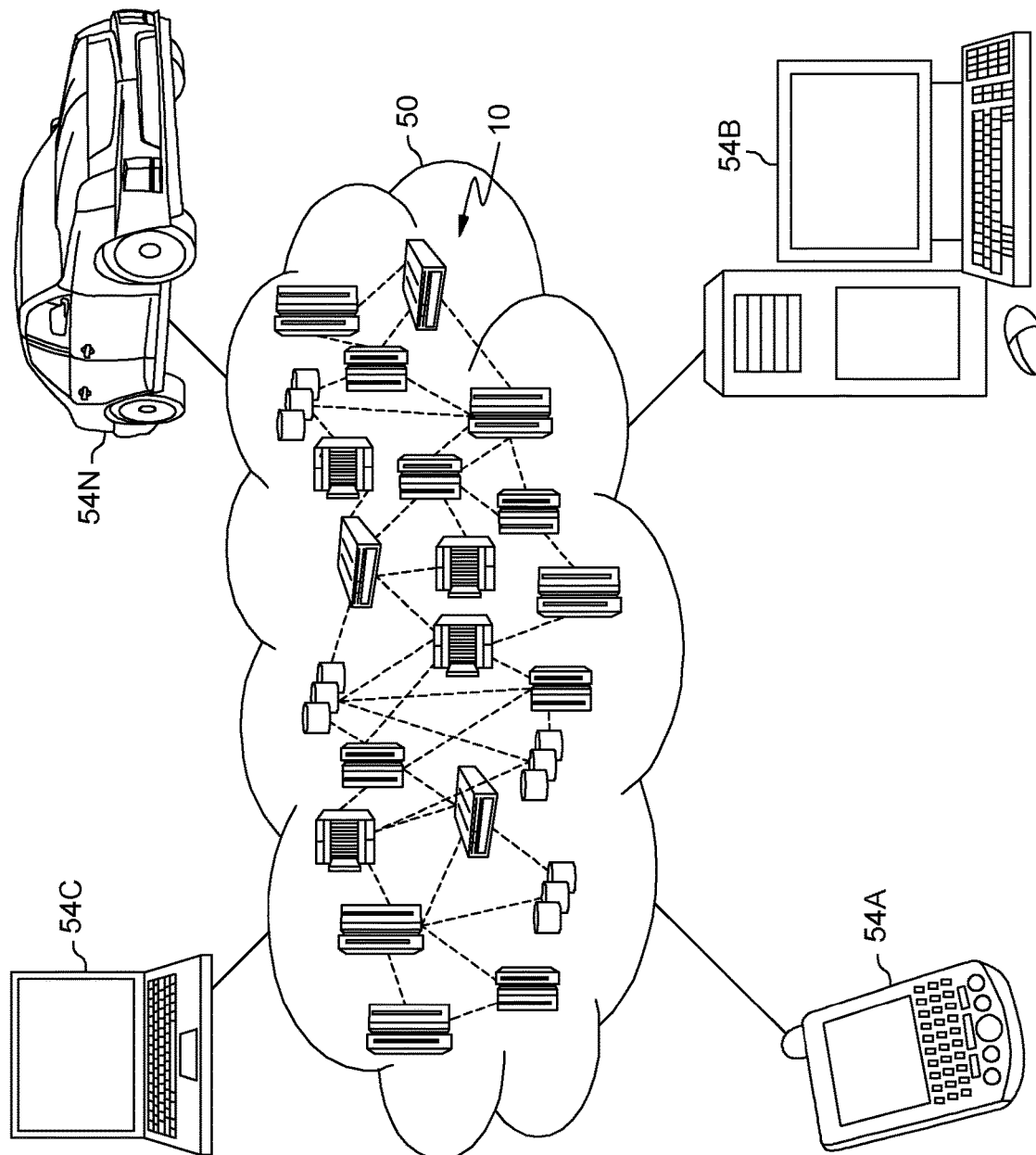
FIG. 6 is a block diagram of one example of a cloud computing environment, in accordance with one or more aspects of the present disclosure.
Figure 7:
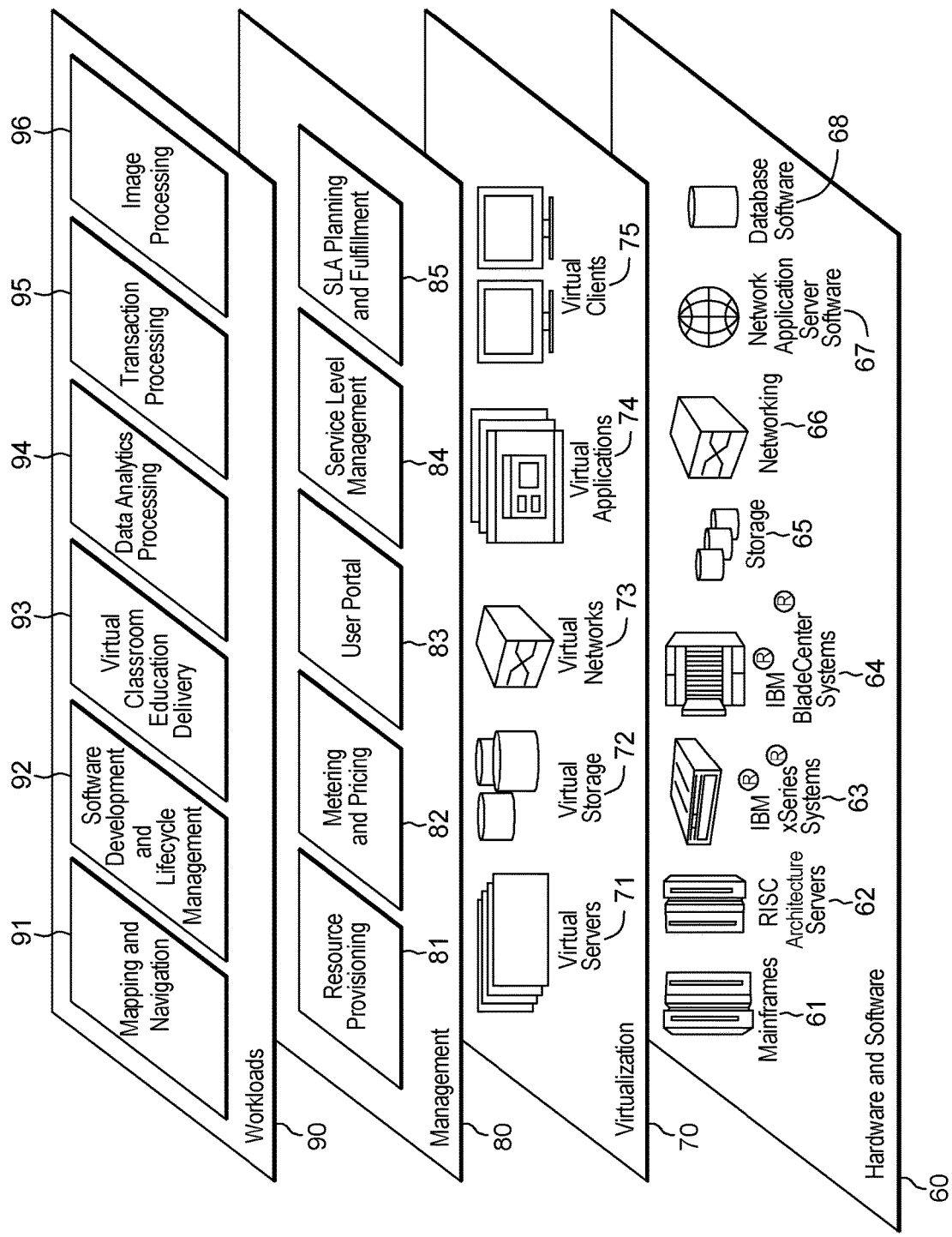
FIG. 7 is a block diagram of one example of functional abstraction layers of the cloud computing environment of FIG. 6, in accordance with one or more aspects of the present disclosure.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 may be used to implement aspects disclosed herein and typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to the flow diagram 100 of FIG. 1.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 6, one example of a cloud computing environment 50, which is useful for implementing one or more aspects of the present disclosure, is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be examples only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method, comprising:
    monitoring, by a data processing system, one or more interactions of a user on a plurality of social media accounts of the user;
    receiving, by the data processing system, input from the user comprising information about the user and one or more goals of the user with respect to the plurality of social media accounts;
    learning, by the data processing system, additional information about the user;
    cognitively analyzing, by the data processing system, the one or more interactions of the user, the input from the user and the additional information about the user to derive one or more preferences of the user regarding the plurality of social media accounts, the one or more preferences comprising at least one topic of relevance to the user;
    cognitively prioritizing, by the data processing system, a plurality of social media posts from among the plurality of social media accounts based on the at least one topic of relevance and the one or more user preferences, the cognitively prioritizing resulting in a plurality of prioritized social media posts; and
    cognitively recommending, by the data processing system, one or more actions to the user based on the plurality of prioritized social media posts, the at least one topic of relevance and the one or more user preferences.

2. The computer-implemented method of claim 1, wherein the monitoring comprises one or more of:
    tracking a time spent by the user on each of the plurality of social media accounts;
    tracking a time the user spends reading posts;
    tracking a type of each post read by the user, the type comprising one or more of text, audio and visual; and
    tracking a time and date of each post read by the user.

3. The computer-implemented method of claim 1, wherein the input from the user comprises one or more of a time-related goal, a goal regarding an individual social media account, a goal related to a number of posts read and a goal related to a type of post.

4. The computer-implemented method of claim 1, wherein the additional information about the user comprises at least one of a physical characteristic, a personality trait, a professional profile, a relationship profile, a location of the user and topics of interest to the user.

5. The computer-implemented method of claim 1, wherein the cognitively prioritizing comprises standardizing the plurality of social media posts for processing, the standardizing resulting in a plurality of standardized posts.

6. The computer-implemented method of claim 5, wherein the standardizing comprises one or more of translating a language into a predetermined language, converting a document into a predetermined format and visual recognition to identify one or more characteristics of a visual post.

7. The computer-implemented method of claim 5, wherein the cognitively prioritizing comprises cognitively prioritizing the plurality of standardized social media posts based on the at least one topic of relevance to the user and the one or more user preferences.

8. The computer-implemented method of claim 5, further comprising providing a level of urgency regarding at least one post of the plurality of standardized posts.

9. The computer-implemented method of claim 8, wherein the one or more actions comprise at least one of an order of viewing one or more of the plurality of social media posts and alerting the user to one or more posts from favorite contacts.

10. The computer-implemented method of claim 1, further comprising refining the one or more user preferences using machine learning.

11. A system, comprising:
    a memory; and
    at least one processor in communication with the memory to perform a method, the method comprising:
        monitoring, by a data processing system, one or more interactions of a user on a plurality of social media accounts of the user;
        receiving, by the data processing system, input from the user comprising information about the user and one or more goals of the user with respect to the plurality of social media accounts;
        learning, by the data processing system, additional information about the user;
        cognitively analyzing, by the data processing system, the one or more interactions of the user, the input from the user and the additional information about the user to derive one or more preferences of the user regarding the plurality of social media accounts, the one or more preferences comprising at least one topic of relevance to the user;
        cognitively prioritizing, by the data processing system, a plurality of social media posts from among the plurality of social media accounts based on the at least one topic of relevance and the one or more user preferences, the cognitively prioritizing resulting in a plurality of prioritized social media posts; and
        cognitively recommending, by the data processing system, one or more actions to the user based on the plurality of prioritized social media posts, the at least one topic of relevance and the one or more user preferences.

12. The system of claim 11, wherein the cognitively prioritizing comprises standardizing the plurality of social media posts for processing, the standardizing resulting in a plurality of standardized posts.

13. The system of claim 12, wherein the standardizing comprises one or more of translating a language into a predetermined language, converting a document into a predetermined format and visual recognition to identify one or more characteristics of a visual post.

14. The system of claim 12, wherein the cognitively prioritizing comprises cognitively prioritizing the plurality of standardized social media posts based on the at least one topic of relevance to the user and the one or more user preferences.

15. The system of claim 12, further comprising providing a level of urgency regarding at least one post of the plurality of standardized posts.

16. A computer program product, comprising:
a storage medium readable by a processor and storing instructions for performing a method of sending notifications, the method comprising:
monitoring, by a data processing system, one or more interactions of a user on a plurality of social media accounts of the user;
receiving, by the data processing system, input from the user comprising information about the user and one or more goals of the user with respect to the plurality of social media accounts;
learning, by the data processing system, additional information about the user;
cognitively analyzing, by the data processing system, the one or more interactions of the user, the input from the user and the additional information about the user to derive one or more preferences of the user regarding the plurality of social media accounts, the one or more preferences comprising at least one topic of relevance to the user;
cognitively prioritizing, by the data processing system, a plurality of social media posts from among the plurality of social media accounts based on the at least one topic of relevance and the one or more user preferences, the cognitively prioritizing resulting in a plurality of prioritized social media posts; and
cognitively recommending, by the data processing system, one or more actions to the user based on the plurality of prioritized social media posts, the at least one topic of relevance and the one or more user preferences.

17. The computer program product of claim 16, wherein the cognitively prioritizing comprises standardizing the plurality of social media posts for processing, the standardizing resulting in a plurality of standardized posts.

18. The computer program product of claim 17, wherein the standardizing comprises one or more of translating a language into a predetermined language, converting a document into a predetermined format and visual recognition to identify one or more characteristics of a visual post.

19. The computer program product of claim 17, wherein the cognitively prioritizing comprises cognitively prioritizing the plurality of standardized social media posts based on the at least one topic of relevance to the user and the one or more user preferences.

20. The computer program product of claim 17, further comprising providing a level of urgency regarding at least one post of the plurality of standardized posts.

* * * * *